J. JUREVICH.
BELT SHIFTER.
APPLICATION FILED AUG. 15, 1917.

1,333,256.

Patented Mar. 9, 1920.
2 SHEETS—SHEET 1.

INVENTOR
John Jurevich.
BY Oscar Gill
HIS ATTORNEY

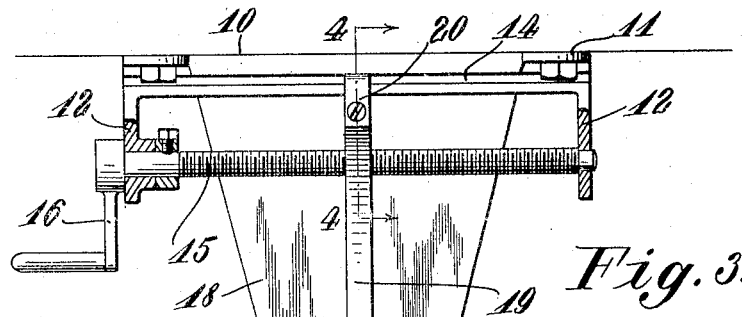
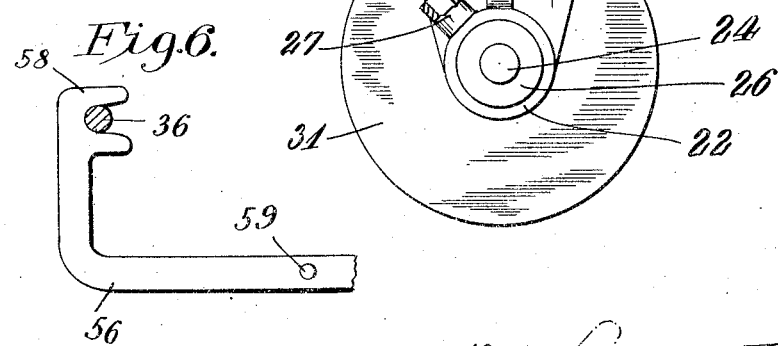
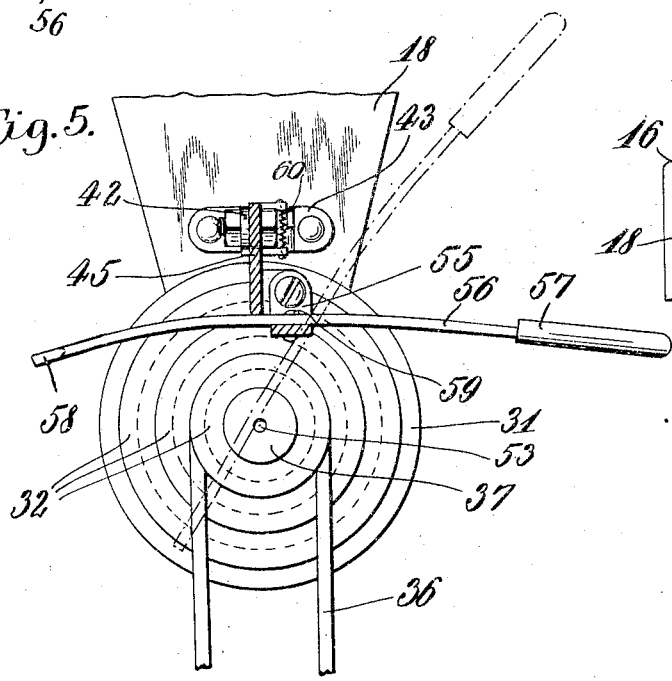

UNITED STATES PATENT OFFICE.

JOHN JUREVICH, OF NEW YORK, N. Y., ASSIGNOR OF ONE-HALF TO JOSEPH K. BOSHKA, OF NEW YORK, N. Y.

BELT-SHIFTER.

1,333,256.  Specification of Letters Patent.  Patented Mar. 9, 1920.

Application filed August 15, 1917. Serial No. 186,325.

*To all whom it may concern:*

Be it known that I, JOHN JUREVICH, a citizen of Russia, resident of New York, county of New York, and State of New York, have invented certain new and useful Improvements in Belt-Shifters, of which the following is a specification.

This invention relates to improvements in belt shifters in which it is desirable to obtain a variety of speeds relative to that of the main driver and also means for keeping the belt in a normally taut condition.

One object is to provide means combined with such belt shifters through which a cone pulley may be driven by frictional contact with the driving pulley. Another object is to start or stop the pulleys instantaneously and also to shift the belt from one of the cones to another in an expeditious and safe manner.

These and other like objects are attained by the novel construction and combination of parts hereinafter described and shown in the accompanying drawings, forming a material part of this disclosure, and in which:—

Fig. 3 is a rear end elevational view of the belt shifter, parts being broken away in order to show the construction.

Fig. 4 is a transverse sectional view taken on line 4—4 of Fig. 3, and

Fig. 5 is a sectional view, taken on line 5—5 of Fig. 1.

Fig. 6 is a detail view of the belt shifting lever.

Figure 1:
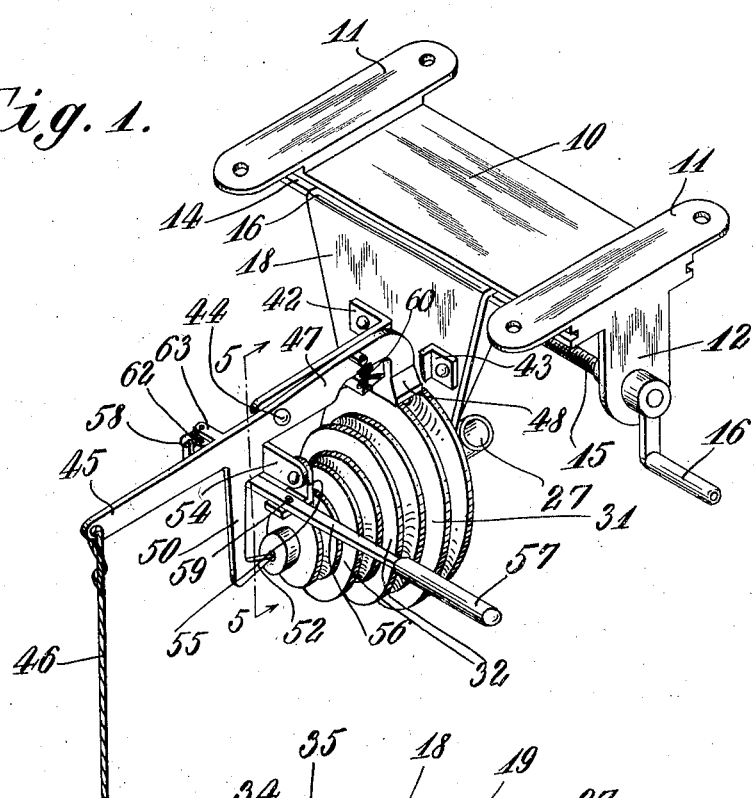
Figure 1 is a perspective view of a belt shifter made in accordance with the invention.
Figure 2:
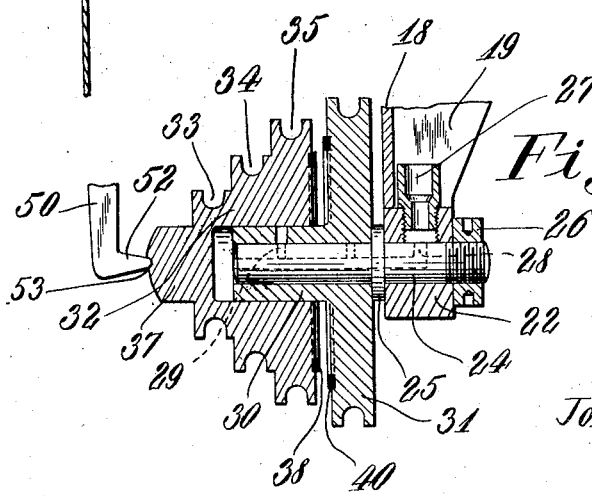
Fig. 2 is a vertical sectional view taken substantially through the axis of the pulleys and stud upon which they rotate.

The belt shifter comprises a relatively thick plate 10 to which at its ends are attached feet 11, provided with openings to receive suitable securing means, while opposite to the feet are raised lugs 12, acting as bearings for the longitudinally disposed screw 15, the same extending through the bearings at one end and having secured upon it an operating handle 16.

Formed in the longitudinal edges of the plate 10, are slots 14, which are slidably engaged the inturned edges 16 of a vertical bracket element 18, the same having an integrally formed rib 19, in which is operatively engaged the screw 15, by means of which it is moved longitudinally of the plate 10, the clip 20 entering the oppositely formed slot so as to hold the bracket in intimate relation with the plate.

The bracket plate 18 terminates at its extreme end in a hub 22, in which is rigidly secured a stud 24, by means of the collar 25 and a clamp or lock nut 26 at its outer end.

Passing radially into the hub is an oil cup 27, its open lower end communicating with an oil passage 28 in the shaft 24, the same being drilled through at its inner end conducting the oil through transverse channels 29 into the hub 30, of a driving pulley 31, mounted to freely rotate upon the end of the shaft 24, against the collar 25.

Freely rotatable upon the hub 30 is a cone pulley 32, having a plurality of annular grooves 33, 34, and 35, respectively, to receive the belt 36 and provided with an extending hub 37 at one end while in the larger end is inserted an annular ring 38 of some material, as leather, adapted to make contact with the similar driving ring 40 inserted in the adjacent surface of the driving pulley 31, so that when the two are in intimate contact, the cone may be driven.

Rigidly secured to the bracket plate 18, are brackets 42 and 43, the former extending outward for some distance and having pivotally secured at its outer end, by the pin 44, a lever 45 in the outer end of which is attached a cord 46 by means of which it may be drawn downward, the opposite end 47, of the lever 45, being downturned and carries a brake contact piece 48, adapted to engage within the belt groove of the driving pulley.

A downwardly extending arm 50, formed with the lever 45, is provided with a tooth-like point 52, adapted to engage within a depression 53 formed in the end of the hub 37, and by means of which both of the pulleys are held in operative position upon the shaft 24, the arrangement being such that it is possible by pulling the cord 46 downward, to press the cone pulley 32 so as to cause engagement between the rings 38 and 40 thereby transmitting rotary motion from the driving pulley to the cone pulley.

In order to move the belt from one step of the cone pulley to the other, a horizontally extending arm 54, secured to the lever 45, has pivotally engaged with it a bracket 55 turned at right angles, the lower angular element acting as a seat upon which is pivoted the belt shifting lever 56, provided with an operating handle 57 at one end and a fork 58 at the other, the same being engageable with the belt 36 and by means of which it may be shifted in an obvious manner, the bracket 55 pivoting so as to allow the shifting lever to be operated in one direction while the lever itself is pivoted on the pin 59 to the bracket in such manner as to allow it to be swung laterally.

In operation, the belt shifter having been secured in its proper position relative to the motive power and mechanism, to be driven, if it be desired to stretch the belt, it is easily accomplished by manipulating the handle 16, causing the bracket element 18 to traverse the fixed plate 10.

When it is required to transmit power to the belt running over the cone pulley 32, the cord 46 is pulled, forcing the friction rings 38 and 40 into intimate contact and when it is desired to stop the rotation of the driving pulley 31, the cord 46 is relaxed, allowing the spring 60 to draw the lever 47 and block 48 secured to the lever 45 down and co-incidentally release the friction rings.

If it be desired to shift the belt from one diameter cone to the other, the handle 57 is operated, it being normally held in inoperative position by means of the pull of the spring 62, one end of which is engaged with the lever near the forks, and the other end of the spring secured to the extending arm 63 formed with the lever 45.

I claim:

In a belt shifter of the class described, the combination of an operating lever, a horizontal arm secured to said lever, a rectangular, two-armed bracket pivotally secured to said arm, a belt shifting lever pivotally secured to the lower angular element of said bracket, a fork at one end of said lever for engaging a belt, said bracket pivoted to said arm and said belt shifting lever pivoted to said bracket to allow a lateral displacement of said bracket and an operation of said belt shifting lever in one direction, an extension on said lever, a spring engaged at one end with said lever near its fork, and with its other end secured to said extension.

In testimony whereof I have affixed my signature.

JOHN JUREVICH.